Feb. 5, 1952 A. R. STARR 2,584,165

INTERFERENCE PREVENTION CIRCUIT

Filed Aug. 21, 1948 4 Sheets-Sheet 1

INVENTOR.
ALFRED R. STARR
BY
Hauff & Warland
ATTORNEY

Feb. 5, 1952 A. R. STARR 2,584,165

INTERFERENCE PREVENTION CIRCUIT

Filed Aug. 21, 1948 4 Sheets-Sheet 2

INVENTOR.
ALFRED R. STARR
BY Hauff & Garland
ATTORNEY

INVENTOR.
ALFRED R. STARR
BY
Hauff + Worland
ATTORNEY

INTERFERENCE PREVENTION CIRCUIT

Filed Aug. 21, 1948

4 Sheets-Sheet 4

INVENTOR.
ALFRED R. STARR
BY
Hauff + Cleveland
ATTORNEY

Patented Feb. 5, 1952

2,584,165

UNITED STATES PATENT OFFICE 2,584,165

INTERFERENCE PREVENTION CIRCUIT

Alfred R. Starr, New York, N. Y.

Application August 21, 1948, Serial No. 45,460

16 Claims. (Cl. 343—113)

The invention here discussed relates to devices for the elimination of interference in the transmission and reception of high frequency electrical impulses.

The object of the present invention is to provide means for the prevention of interference in such systems. The present system is particularly applicable in the radio control of torpedoes, airplanes, guided missiles, and the like. Other desirable objects and novel features by which all purposes of the invention are attained are set forth or will appear in the course of the following specification. This application is in part a continuation of my co-pending application, Ser. No. 470,522, filed December 29, 1942, for a Radio Direction Finder now Patent No. 2,448,006.

The drawing accompanying and forming part of the specification illustrates various features and practical embodiments of the invention. It is realized, however, that such features and structure may be embodied and changed all within the true spirit and broad scope of the invention as hereinafter defined and claimed.

Figure 1:
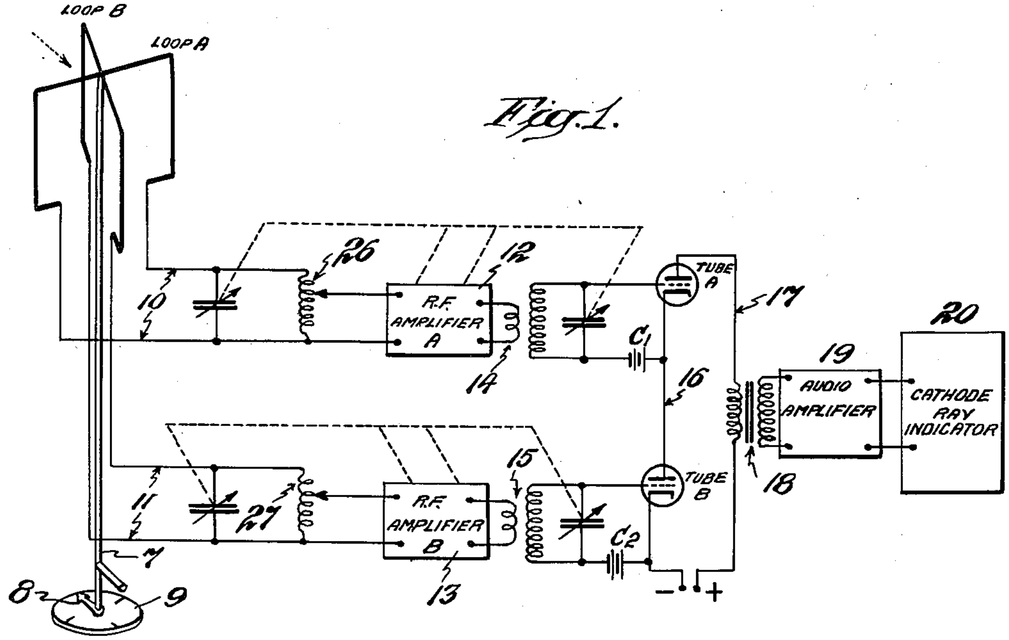
Figures 1, 2 and 3 show a part of the equipment covered in my co-pending application referred to above, with the radio frequency amplifiers tuned to different frequencies.
Figure 2:
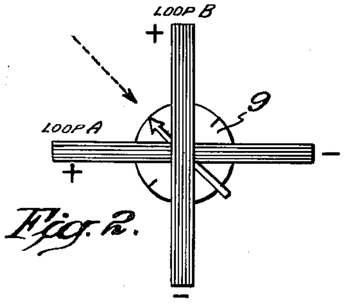

Referring to Figure 1, the invention is illustrated as applied to a radio direction finder including crossed loop antennas comprising a pair of loop aerials A and B mounted, preferably in angularly adjustable relation on a rotatable post or support 7 which may carry an indicator or pointer 8 reading on a direction scale 9.

The respective loops are connected by wiring 10 and 11, with radio frequency amplifiers 12 and 13, identical in respect to gain and selectivity.

The outputs of the R. F. amplifiers are fed into a series plate combining circuit coupled by transformers 14 and 15, R. F. amplifier A feeding into the grid of tube A, which is biased to the cutoff point by battery C and amplifier B feeding into the grid of tube B, similarly biased.

The loops are tuned to different frequencies and each R. F. amplifier and variable condenser is tuned to the frequency of its particular loop as indicated by the dotted lines in Figure 1.

The receiver is intended to be used in a system wherein radio waves are transmitted on two different carriers with the same modulation.

The R. F. amplifiers may be of conventional or special design and the same is true of the audio amplifier.

Volume controls are indicated at 26, 27, for varying the intensity of the signals from the loops.

Figure 3:
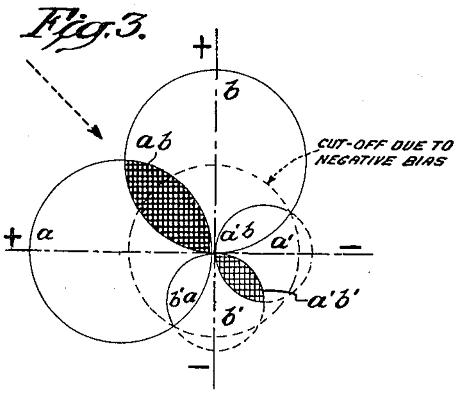

Figure 3 shows the response curves of the two crossed loops superimposed one on the other, loop A producing the aligned, large and small circular lobes *a*, *a'* at one frequency and loop B producing similar lobes *b*, *b'* at another frequency.

The circuit shown in Figure 1 is designed so that only parts of the response curves which are common will give a signal response. These parts are shaded to show the overlapping portions of the larger lobes *a*, *b*, producing an elliptical response lobe *a*—*b*, and lesser elliptical lobes *a'*—*b'*, *a*—*b'* and *b*—*a'*. The lobe *a*—*b* is the resultant output of the series plate circuit when the instantaneous potentials of both loops are positive. The result is a sharp maximum response of both frequencies in the direction of signal origin. The angle between the crossed loops may be varied as by reducing the included angle between the loops to increase the sharpness of response. The 90° angular relation shown however has proved satisfactory for most purposes.

The ordinary loop direction finder operates on the minimum signal, where interference may prevent obtaining a sharp and accurate reading, whereas in the present invention a sharp signal is obtained in the indicating circuit. This maximum signal is less likely to be affected by interference because the signal-to-noise ratio is greater. Moreover, in order to block the resultant signal it would be necessary to match both frequencies.

Also the present invention gives the proper sense of the bearing, without going through the second operation of switching in a second antenna, such as has been necessary heretofore. Thus time is saved by getting the correct reading in one operation.

Due to the directional effect and the use of two frequencies, this new system will discriminate against radio interference or "noise" to a greater extent than the ordinary loop direction finder.

For instance, the total noise coming from random directions will be approximately in proportion to the active lobe of the combined response curves, whereas in the ordinary loop, the total noise will be in proportion to the full area of the response curve.

In actual operations only the combined lobe $a$—$b$ of Figure 3 is effective. The lobes $a'$ and $b'$ are smaller than lobes $ab$ because of antenna effect. As a consequence, the combined lobe $a'b'$ is smaller than the combined lobe $ab$ in the direction of the signal and by reason of the tubes in the series plate circuit being biased beyond the cutoff point, signals in the region $a'$—$b'$ disappear.

When the system is operating on two frequencies, the lobes $b'a$ and $a'b$ will not be cancelled out due to phase discrimination. This effect can be eliminated by increasing the bias voltages in the batteries $C_1$ and $C_2$ considerably beyond cutoff to eliminate all lobe portions within the dotted circle in Figure 3 leaving as the resultant signal the portion of the lobe $a$—$b$ outside the circle. Another way is to convert to a common frequency by means of heterodyne oscillators to cancel unwanted lobes whereby the effect shown in Figure 3 is obtained.

In further explanation of the fact that the undesired sections $b'a$ and $a'b$ are automatically blocked out when operating on the same frequency, it may be assumed that the instantaneous polarity of loop A is such that the grid of tube A is positive and that the polarity of loop B is such that the grid of tube B is positive. Then the plate circuit will be conductive during the positive half cycles as shown on the characteristic curves at $a$ and $b$, Fig. 3. Therefore, any signal in the sector $ab$ will cause a response in the indicating device.

Assuming a signal in sector $ab'$, loop $aa'$ will be positive and loop $bb'$ will be negative when operating on the same frequency. The grid of tube A will be positive and the grid of tube B will be negative at the same instant. During the next half cycle grid of tube A will be negative and grid of tube B positive as represented in Figure 3. Therefore, no current will flow in the plate circuit and any signal in this sector would not register on the indicating device. Similarly, any signal in sector $a'$—$b$ will be blocked out at the same frequency.

The invention has many uses, for example as a homing device for airplanes, direction finding for airplanes from ground stations, location of enemy planes from ground stations by triangulation, marine direction finding, direction finding on airplanes from beacons, use with reflected signal systems for altimeters, in a control device for guided missiles, for determining distance and the like.

Figure 4:
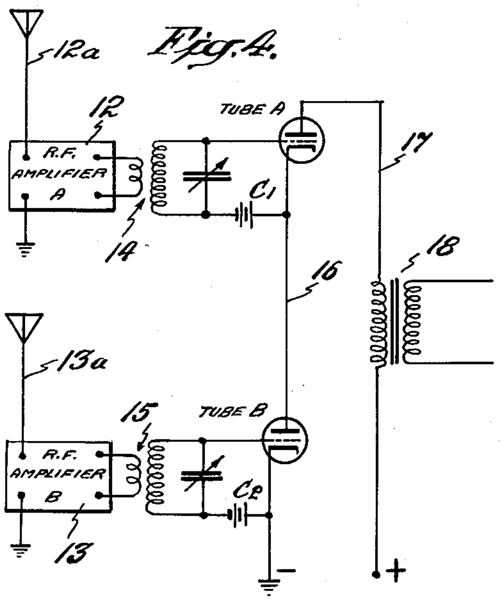
Figure 4 illustrates a modification of the equipment shown in Figure 1.
Figure 5:
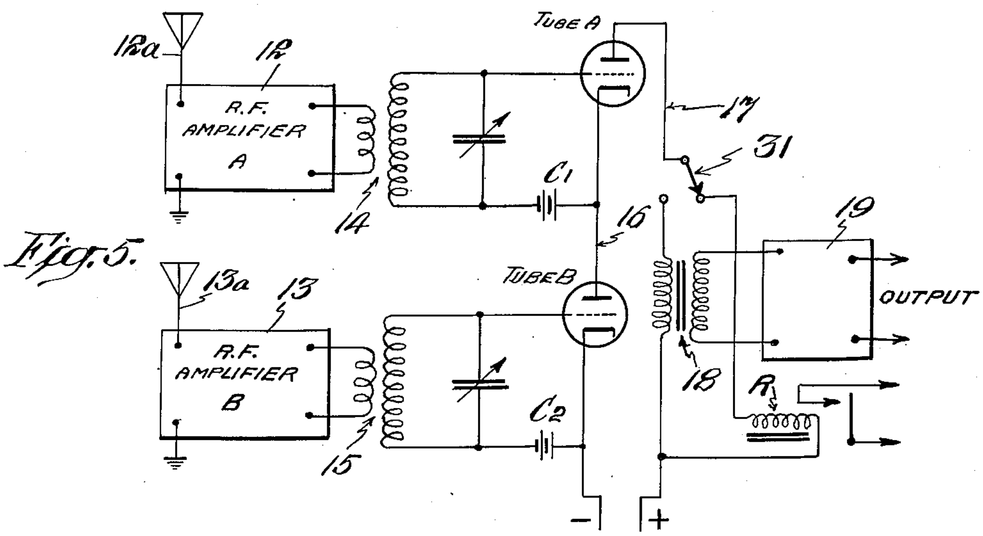
Figure 5 illustrates a further modification of the equipment shown in Figure 1.

In Figures 4 and 5 are shown a portion of the equipment shown in Figure 1. This equipment also provides means for preventing interference. The R. F. amplifiers 12 and 13 are provided with antennas 12$a$ and 13$a$ respectively. The R. F. amplifiers and antennas are tuned to different frequencies.

The R. F. amplifiers 12 and 13 are shown coupled by tuned R. F. transformers 14, 15 into the series plate combining circuit, R. F. amplifier A feeding into the grid of tube A which is biased to the cutoff point by the "C" battery $C_1$ and amplifier B feeding into the grid of tube B similarly biased.

The plate circuits of the two tubes are connected in series relation by connections 16, leading from the cathode of tube A to the plate of tube B.

The combined plate circuit is shown connected at 17 into the primary of an audio input transformer 18 feeding into a conventional audio amplifier 19.

A possible modification is shown whereby a relay may be operated by the combined action of the two R. F. carrier frequencies.

An S. P. D. T. switch is arranged as shown to connect the plate circuit thru a sensitive relay instead of the audio transformer.

Tube A and tube B each being biased to the cutoff point, no current will normally flow in the plate circuit during periods when there is no signal on either grid.

When an R. F. carrier signal is received on antenna 12$a$ and amplified by the R. F. amplifier 12, the grid of tube A will be made less negative and tube A will become conductive. If at the same time a signal is received on antenna 13$a$ and amplified the grid of tube B will become less negative and tube B will become conductive.

A current will then flow in the plate circuit and the relay will be operated or if the R. F. carriers are modulated at an audio frequency, the said audio frequency will be transferred by means of the audio transformer, and audio amplifier.

If only one R. F. carrier had been received, one tube would have been conductive but the other tube would have blocked the current in the plate circuit and no action would have taken place.

This system is useful in the radio control of torpedoes, airplanes, guided missiles, etc., and is also effective in the reduction of static.

If desired three or more frequencies may be employed. The necessary equipment would be obvious from the above description to one skilled in the art and therefore is not shown here.

Figures 6, 7A:
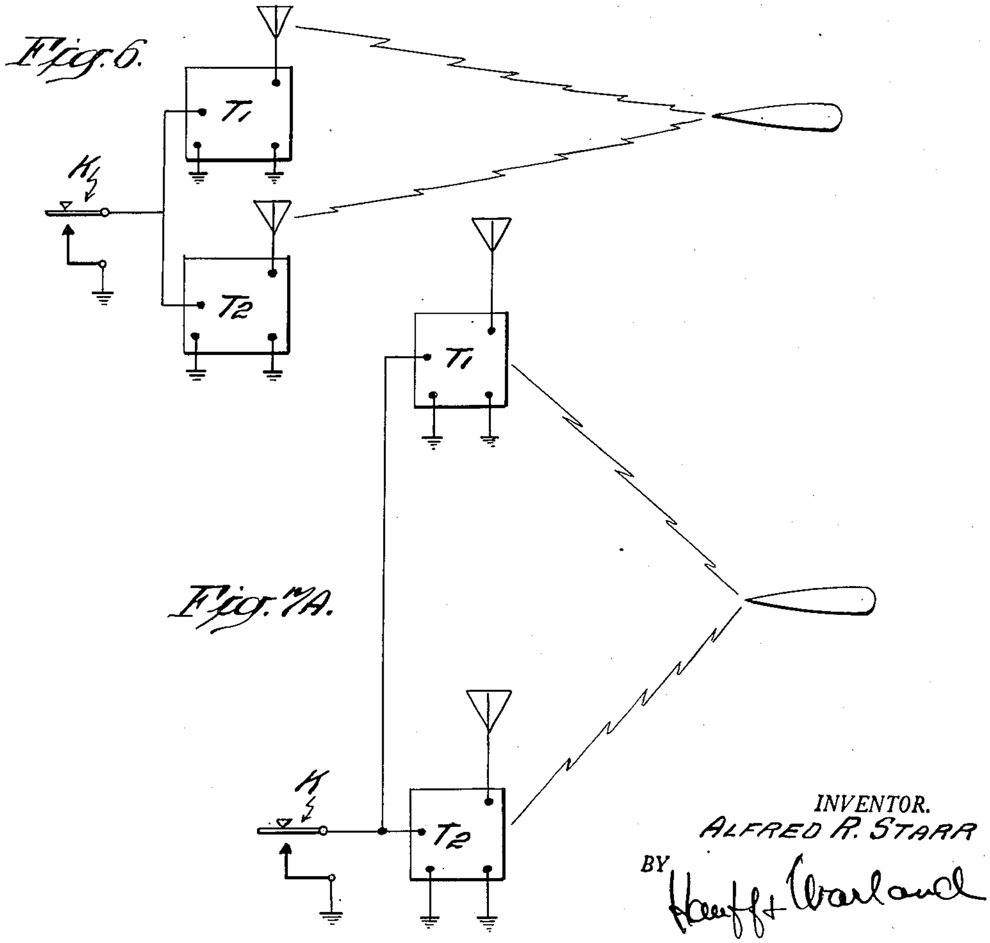
Figure 6 illustrates a system applying the principles of my invention in the control of a torpedo.
Figure 7A illustrates a modification using two direction finders.

In Figure 6 is shown a modification of my direction finder in application Ser. No. 470,522 filed December 29, 1942 whereby the two crossed loop antennas are operated at different radio frequencies. A complete receiver as shown in Fig. 1 is installed on the torpedo shown in Fig. 6. The advantage of this method is that I combine the directive effect of the direction finder with an interference prevention system.

Two transmitters $T_1$ and $T_2$ are set up at the same location and transmit simultaneously on different frequencies. The two R. F. transmitters may be modulated with the same audio frequency.

One advantage of this system is that the degree of interference prevention is increased by the directive effect.

For instance the interference prevention due to the use of two frequencies might produce an advantage of 1000:1 and the directive effect might produce a gain of 100:1 thus reducing the reception from an undesired station by a ration of 100000:1 as compared with a desired station.

Figure 7C:
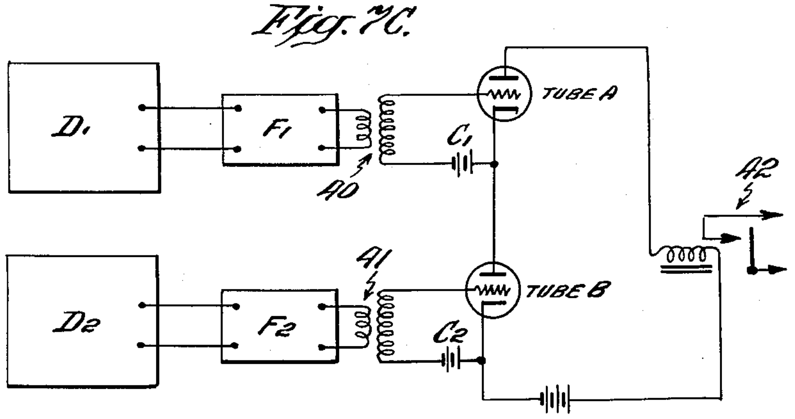
Figure 7C shows a hookup for operating the relay.
Figure 7B:
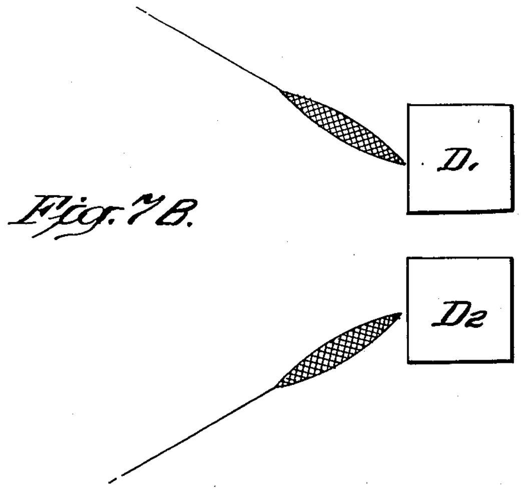
Figure 7B is a response curve diagram of Figure 7A.

In Figure 7A is shown two transmitters at different frequencies while in Figures 7B and 7C two direction finder receivers are shown. Receiver $D_1$ receives from a transmitter $T_1$ placed at an angle to the base line in this particular illustration. Receiver $D_2$ receives from transmitter $T_2$ also located at an angle to the base line.

One possible application would be to have the two direction finders installed on a submarine torpedo and to have the two transmitters located on shore a distance apart so as to give the desired angles. The two transmitters would be connected by a control line and the two controlled simultaneously.

The transmitters could be on the same or different frequencies as desired and might be modulated by the same or different modulation frequencies for the purpose of interference prevention.

In Figure 7B is also shown the response curve of each direction finder, showing that even if the same frequency were used for both transmissions, the relay would not be actuated unless signals were received from both transmitters simultaneously. The response curve of each receiver $D_1$ and $D_2$ is similar to Figure 3.

This feature would produce a high degree of interference prevention which would be still further increased by using different radio frequencies and also by using different audio frequencies for modulating the two transmitters.

In Figure 7C is shown the wiring diagram of the equipment for operating the relay. Each receiver $D_1$ and $D_2$ comprises the same equipment as shown in Figure 1. The output of receiver $D_1$ is connected to filter $F_1$ and the output of receiver $D_2$ is connected to filter $F_2$. Filter $F_1$ is connected through an audio coupling transformer 40 to the grid of tube A which is biased to the cutoff point by "C" battery $C_1$.

Filter $F_2$ is connected through an audio coupling transformer 41 to the grid of tube B which is also biased to the cutoff point of "C" battery $C_2$. The plate circuits of tubes A and B are connected in series relation and also in series with the relay 42.

Figure 8:
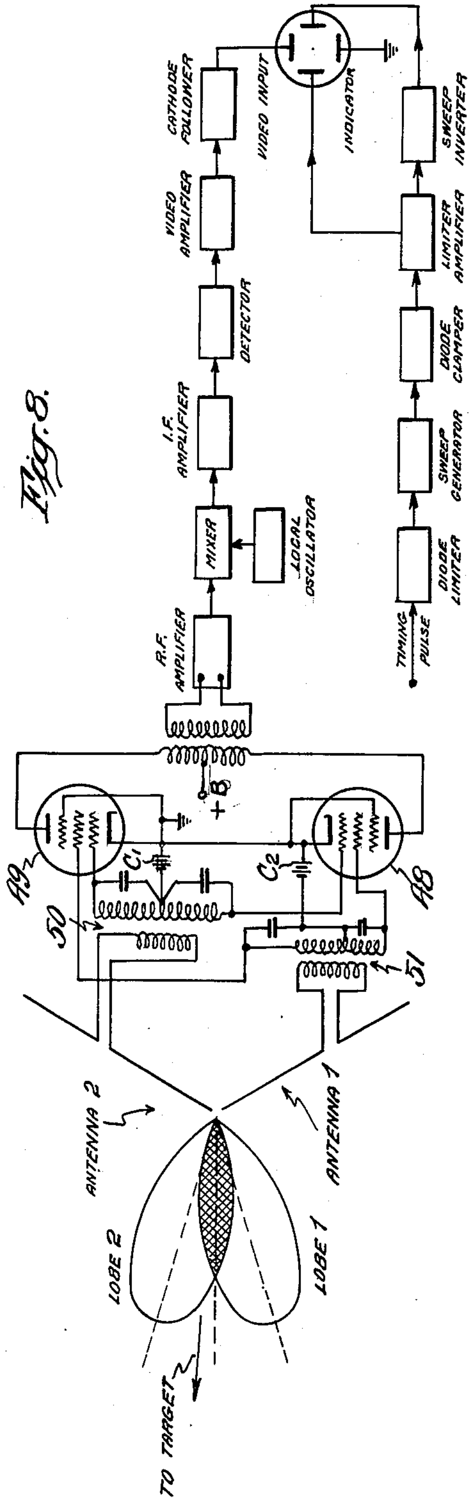
Figure 8 illustrates an arrangement for sharpening the response and for the elimination of interference in a radar system.

In Figure 8 is shown a method whereby the principle of the direction finder shown in Figure 1 can be applied to direction finding in radar systems.

Two dipoles are connected to the input circuits of two dual grid tubes operating in push pull. The output of the dual grid tubes feed into a conventional radar receiver, a block diagram of which is shown together with a cathode ray tube indicator and a conventional sweep circuit.

The two dipoles are mounted so that their patterns overlap at approximately the half power points.

Whereas in conventional radar systems the receiver is switched alternately from one dipole to the other either by mechanical or electronic switching, in the present invention both dipoles are connected to dual input circuits.

The two dipole patterns will be combined as in Figure 1 and the response of the receiver will pass through a maximum as the antenna system is revolved. The maximum response will occur when the response from the two dipoles is equal. In conventional systems the magnitude of the response must be compared on the cathode ray indicator screen.

It will be seen that the method used in the present invention is simpler in equipment and operation than conventional methods.

Two dual grid tubes such as 6AK5's 48 and 49 are connected in push pull as shown.

No. 1 grid of each tube is connected to the secondary winding of an R. F. transformer 50. The center tap of the secondary winding is connected to the negative terminal of a "C" battery $C_1$, the positive terminal of which is connected to the cathode of the 6AK5 tube which is also grounded. The value of the "C" battery is such as to cause the tube to work at cutoff.

Dipole 1 is connected to the primary of the R. F. transformer 51.

Similarly No. 2 grid of each tube is connected to the secondary winding of an R. F. transformer 51. The center tap of the secondary winding is connected to the negative terminal of a "C" battery $C_2$, the positive terminal of which is connected to the cathode of the 6AK5 tube 48 which in turn is grounded. The value of the "C" battery is such as to cause the tube to work at cutoff. Dipole 2 is connected to the primary of the R. F. transformer 50.

Tube 48 will operate on the positive half of the R. F. cycle and tube 49 on the negative half. The positive and negative halves will be combined in the push pull output transformer and will be transferred to the R. F. amplifier. The remainder of the radar receiver is of conventional type. The superheterodyne receiver is used almost universally because it provides a higher over-all gain with fewer tubes than do other types of receivers. The heterodyne principle involves the conversion of the higher carrier frequency to an intermediate frequency at which the gain per stage can be made greater. The frequency conversion is accomplished by mixing, or beating, the received signal with a signal of different frequency generated in the receiver. The mixer stage produces an output voltage at a frequency which is the difference of the two signals applied. This difference signal is amplified by the intermediate-frequency (I.-F.) amplifier, and is then detected and amplified by the video amplifier. For purposes of illustration a carrier frequency of 100 megacycles has been chosen. The local oscillator frequency is 85 megacycles giving a beat frequency of 15 megacycles which is applied to the I. F. amplifier. The I. F. amplifier must have sufficient band width to pass a pulse of R. F. without distortion.

The R. F. amplifier may use 6AK5 tubes or other equivalent. The local oscillator may be a No. 955 or equivalent tube and the mixer a suitable diode. The I. F. amplifier may use 4 stages of 6AC7 tubes and the detector may be one-half of a 6H6 diode. The video amplifier may be a 6AC7 tube and the cathode follower may be one-half of a 6SN7 tube. The signal is transmitted from the video amplifier to the indicator by the cathode follower the purpose of which is to present a circuit of low impedance to the indicator while not loading the video amplifier. The function of the indicator is to measure the time required for the transmitted pulse to travel to the target and return and to apply this time to measure the distance between the target and the radar set. To perform this function the trace on the cathode ray tube screen can be calibrated in terms of distance. The spot on the tube is usually deflected by a saw-tooth waveform to produce a linear time base. Since zero time for each sweep is the instant when the transmitted pulse starts, the saw-tooth must be very carefully synchronized with the transmitted pulse. The timing pulse is obtained from the transmitter and is limited by the diode limiter. This in turn controls the starting of the sweep generator. The sweep generator uses a vacuum tube to control the charging and discharging of a capacitor. The input timing pulse from the transmitter is applied to the sweep generator through the diode-limiter. The pulse duration is approximately 5 microseconds.

When the positive timing pulse from the diode limiter is applied to grid of the sweep generator, the grid is swung positive drawing grid current and charging the capacitor.

The sweep is applied in push-pull to the deflecting plates to avoid defocusing effects. In order to obtain a positive-going voltage wave to apply to the right hand horizontal deflecting plate, it is necessary to change the polarity of the output of the sweep-amplifier tube. The voltage divider reduces the amplitude of the voltage applied to the phase inverter tube by a factor equal to the gain of the tube. In this way a pulse of opposite polarity and equal voltage is generated. This radar receiving system is designed to be used in conjunction with a conventional radar transmitter. All parts are conventional with the exception of antennas 1 and 2, R. F. coupling transformers 50 and 51 and tubes 48 and 49.

The transmitter operates on a single frequency and is pulse modulated in the conventional manner.

Figure 9:
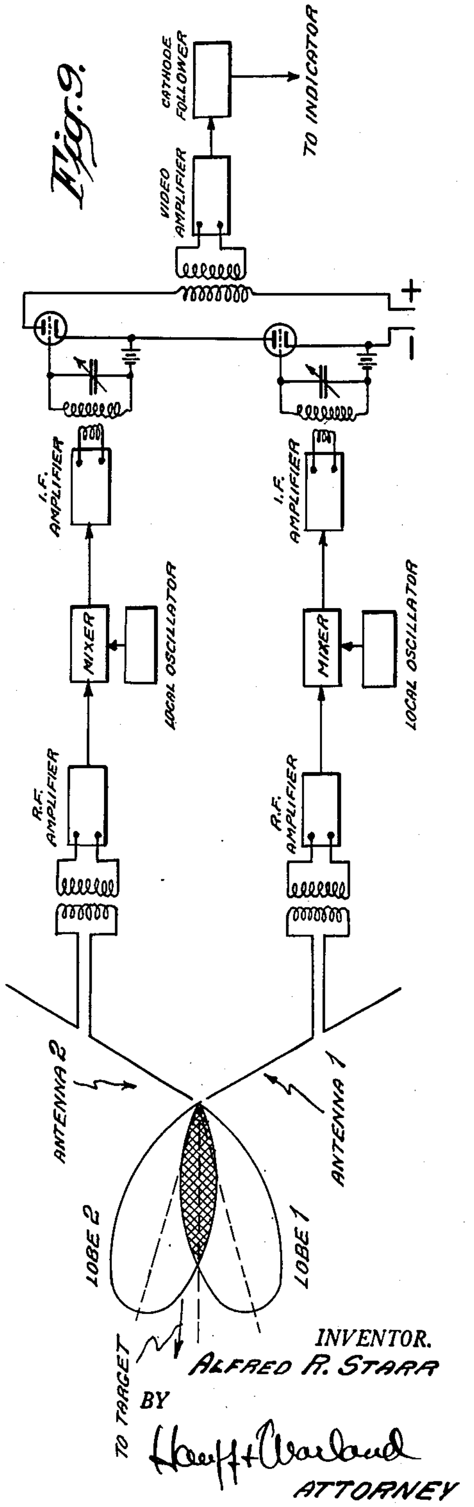
Figure 9 is a modified application of the system to radar.

Figure 9 shows the series plate combining circuit of Figure 1 connected with dipoles through a conventional radar R. F. assembly and followed by a radar video amplifier, cathode follower and indicator, the indicator being supplied with a conventional sweep circuit of the type shown in Figure 8. In place of the series plate combining circuit, a single tube having dual grids of the type shown in my co-pending applications Ser. No. 470,522 filed December 29, 1942, and Ser. No. 568,719 filed December 18, 1944, now Patent No. 2,500,212, granted March 14, 1950, may be used.

In Fig. 9 is shown a radar system wherein two dipoles each having lobe patterns as shown as lobe 1 and lobe 2 are connected to conventional R. F. channels, each consisting of R. F. amplifier, mixer, local oscillator and I. F. amplifier. The operation of these R. F. channels is the same as described for Fig. 8.

Each I. F. channel is connected to a series combining circuit through a tuned input circuit as shown. The series combining circuit is similar to that shown in Fig. 1 and in my Patent No. 2,448,006 and therefore need not be again described. The output of the series combining circuit is connected to a video amplifier, cathode follower and cathode ray indicator. The operation of these is the same as described for Fig. 8.

A diode limiter, sweep generator, diode clamper, limiter amplifier and sweep inverter are connected to the same indicator. Since their operation is the same as in Fig. 8 it need not be again described.

The two lobe patterns for the two dipoles are shown as partially overlapping. Waves coming from various angles as shown in lobe 1 will be transmitted as far as the I. F. amplifier in the first R. F. channel. Similarly waves coming from various directions as shown in lobe 2 will be transmitted as far as the I. F. amplifier in the second R. F. channel. The action of the series plate circuit is such that it will transmit only signals common to both input circuits. Therefore only signals as shown in the shaded portion common to both lobes will be transmitted from the common output plate circuit to the video amplifier. The net result will be to narrow the lobe pattern of the radar receiver and to give a maximum response to signals coming from the direction indicated. This makes unnecessary lobe switching and the comparison of the received signals and therefore produces a system simpler in operation.

Although the invention has been described in connection with radio frequencies, it is also applicable to use with intermediate frequencies and with audio frequencies as described in my application Ser. No. 568,719 filed December 18, 1944.

What is claimed is:

1. In a radio receiving system, a plurality of signal intercepting means, radio frequency amplifiers connected therewith and tuned to different frequencies, thermionic devices having input circuits connected with said amplifiers and output circuits connected in series relation to produce a resultant signal related to the common components of the combined output of said signal intercepting means.

2. In a radio receiving system, a plurality of signal intercepting means, radio frequency amplifiers connected therewith and tuned to different frequencies, thermionic devices having input circuits connected with said amplifiers and output circuits connected in series relation, said thermionic devices being severally biased to normally prevent current flow in said output circuits and a device connected with the output circuits responsive to the common components of said signal intercepting means.

3. In a radio receiving system, the combination of two crossed loop antennas tuned to different frequencies, a radio frequency amplifier for each of said loop antennas tuned to the frequency of its particular loop, thermionic devices having input circuits connected with said amplifiers and output circuits connected in series relation, and a device connected with said output circuits to produce a signal which is the resultant of the common components of the combined output of said loops.

4. In a radio receiving system, the combination of two crossed loop antennas tuned to different frequencies, a radio frequency amplifier for each of said loop antennas tuned to the frequency of its particular loop, thermionic devices having input circuits connected with said amplifiers and output circuits connected in series relation, said thermionic devices being severally biased to normally prevent current flow in said output circuits and a device connected with the output circuits to produce a signal which is the result only of the common components of the combined output of said loops.

5. In a radio receiving system, a plurality of signal intercepting means tuned to different frequencies, multiple amplifying means tuned to the frequency of the respective signal intercepting means, thermionic tube means connected with the multiple amplifying means and having plate circuits connected in series and grid circuits biased whereby the unwanted lobes in the combined response curves are eliminated.

6. In a radio receiving system, a plurality of signal intercepting means, amplifying means for different frequencies connected therewith, and a signal combining circuit comprising thermionic devices having plate circuits connected in series relation associated with said amplifying means and responsive only to selected portions of the response of said plural intercepting means.

7. In a radio receiving system, a plurality of signal intercepting means, amplifying means for different frequencies connected therewith, a signal combining circuit comprising thermionic devices having plate circuits connected in series relation and a relay connected with said plate circuit responsive only to the combined effect of the plural intercepting means transmitted in the plate circuit.

8. In a radio receiving system, a plurality of signal intercepting means at different frequencies, and thermionic coincidence devices having grid circuits biased to eliminate unwanted lobes and plate circuits connected in series relation and receptive only to the common portions of the response of said plural intercepting means.

9. In a radio receiving system, a plurality of signal intercepting means at different frequencies, and a signal combining circuit comprising a plurality of thermionic devices having grid circuits biased to eliminate unwanted lobes and plate circuits connected in series relation and receptive only to selected desired portions of the response of said plural intercepting means.

10. In a radio receiving system, a plurality of signal intercepting means in variable angular relation to one another tuned to different frequencies and a plurality of thermionic devices having respective control grid circuits connected to said plural intercepting means and having plate circuits connected in series relation, whereby the desired common portions only of the response of said plural intercepting means are received.

11. In radio direction finder, the combination of two crossed loop antennas operating at different frequencies, means for converting the different frequencies to a common frequency, amplifying means, thermionic tube means connected to said amplifiers and having plate circuits connected in series and whereby two of the unwanted lobes in the combined response curves are cancelled out by the combined effect of phase relations and properties of said series connected circuit.

12. In a radio receiving system, a plurality of signal intercepting means tuned to different frequencies, amplifying means connected therewith and tuned to the frequency of each intercepting means and electronic interlocking means comprising thermionic devices having plate circuits connected with said amplifying means and operable only by signal forces simultaneously present in said intercepting means.

13. In a radio receiving system, two crossed loop antennas tuned to different frequencies, respective amplifying means therefor tuned to the frequency of each particular loop antenna and an electronic interlocking circuit comprising a dual grid vacuum tube having negatively biased grid circuits to eliminate undesired lobes connected with said amplifying means, whereby current is normally prevented from flowing in the plate circuit of said dual grid tube, and said tube being thereby arranged for selecting and combining only desired portions of the response curves of said crossed loop antennas.

14. In a radio receiving system, the plurality of crossed loop antennas tuned to different frequencies, respective amplifying means therefor tuned to the frequency of each antenna and an electronic interlocking combining circuit, comprising a dual grid thermionic device with both grids biased to normally prevent current flow in the plate circuit, for selecting the sharp maximum lobe and for rejecting other undesired lobes of the combined response curves of said crossed loop antennas.

15. In a high frequency receiving system, the combination of dual signal intercepting means, amplifying means connected therewith, an electronic interlocking circuit comprising thermionic devices including grid circuits respectively connected with the dual signal intercepting means, a plate circuit responsive only to signals simultaneously present in the grid circuits and a video amplifier and cathode ray oscillograph with synchronized sweep circuit responsive to the output signals in the plate circuit.

16. In a high frequency receiving system, the combination of dual signal intercepting means, amplifying means connected therewith, an electronic interlocking circuit comprising a dual grid thermionic device having negatively biased grid circuits connected with the amplifying means whereby current is normally prevented from flowing in the plate circuit and whereby said plate circuit is only responsive to signals simultaneously present in the grid circuits and a video amplifier and cathode ray oscillograph with synchronized sweep circuit responsive to the output signals in the plate circuit.

ALFRED R. STARR.

REFERENCES CITED

The following references are of record in the file of this patent:

UNITED STATES PATENTS

| Number | Name | Date |
|---|---|---|
| 1,654,920 | Chaffee | Jan. 3, 1928 |
| 1,717,662 | Chaffee | June 18, 1929 |
| 1,776,065 | Chaffee | Sept. 16, 1930 |
| 1,836,594 | Heising | Dec. 15, 1931 |
| 1,964,598 | Rohnfeld | June 26, 1934 |
| 2,448,006 | Starr | Aug. 24, 1948 |